INVENTOR
PETER BRAMHAM
THOMAS RAYMOND CHIPPENDALE
BY
AGENT

Sept. 30, 1958    T. R. CHIPPENDALE ET AL    2,854,638
WAVEGUIDE HYBRID RING
Filed June 14, 1954    2 Sheets-Sheet 2
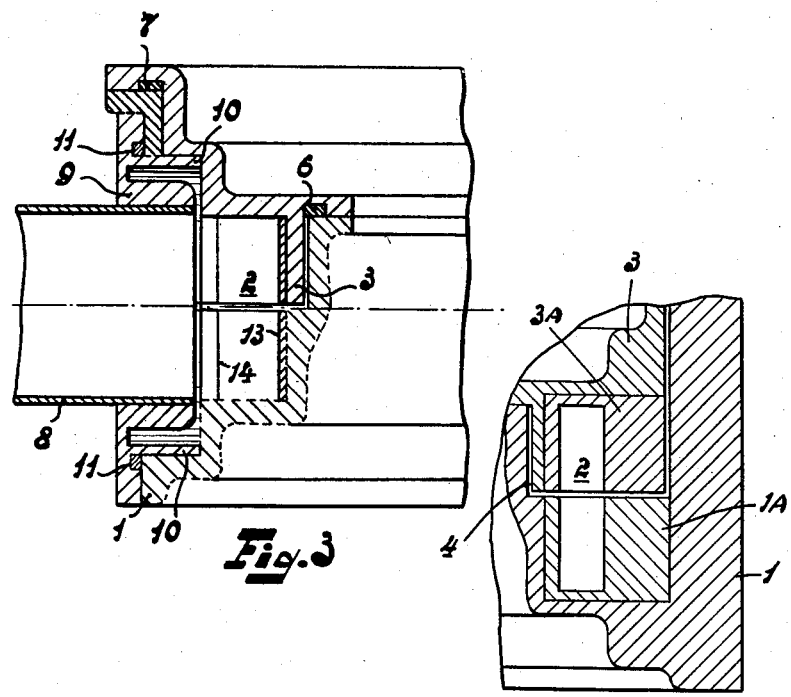
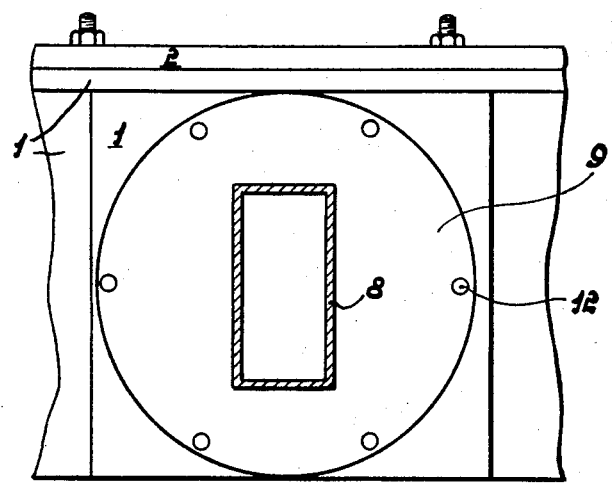
INVENTOR
PETER BRAMHAM
THOMAS RAYMOND CHIPPENDALE
BY
AGENT United States Patent Office
2,854,638
Patented Sept. 30, 1958

2,854,638
WAVEGUIDE HYBRID RING

Thomas Raymond Chippendale, Horley, and Peter Bramham, Redhill, England, assignors, by mesne assignments, to North American Philips Company, Inc., New York, N. Y., a corporation of Delaware Application June 14, 1954, Serial No. 436,614

Claims priority, application Great Britain July 28, 1953

9 Claims. (Cl. 333—11)

This invention relates to waveguide hybrid rings comprising an annular hollow pipe waveguide and hollow pipe waveguide side branches. Hybrid rings may be used, for example, to combine electrical wave energy from a plurality of coherent systems or to partition wave energy from a single source between systems connected to two of the side branches.

It is known to manufacture a hybrid ring by electrodeposition and so obtain a hybrid ring in one piece. Such hybrid rings are difficult to adjust.

It is also known to manufacture hybrid rings of two members, each containing part of the annular hollow pipe waveguide, which members are soldered together along the junction between the two members, the side branches being joined to a surface comprising the soldered junction. To manufacture such hybrid rings for use in an evacuated system or in a pressurised system is difficult.

The object of the invention is to provide an improved hybrid ring.

According to the invention, in a gas-tight hybrid ring comprising an annular hollow pipe wave-guide and hollow pipe waveguide side branches, the annular hollow pipe waveguide comprises a plurality of members and the vacuum joins are separate from the electrical junctions.

An annular cavity for the annular hollow pipe waveguide may be enclosed partly by a non-porous first member and partly by a non-porous second member, the first member having an annular trough in which the second member is accommodated.

The annular cavity of the annular hollow pipe waveguide may be provided, in an alternative embodiment, half in the second member, the first and second members being machined from forgings of a material having good electrical conductivity. As an alternative, the surfaces of the first and second members defining the annular cavity may be coated with a material having good electrical conductivity.

The annular cavity of the annular hollow pipe waveguide may be provided in an alternative embodiment, half in a third member and half in a fourth member, the third and fourth members being accommodated in the annular hollow enclosed by the first and second members. The third and fourth members may be made from a material having good electrical conductivity or, as an alternative the surface of the third and fourth members defining the annular cavity may be coated with a material having good electrical conductivity. Coating may be by electrolytic deposition. The third and fourth members will be enclosed within the gas-tight first and second members.

Annular vacuum seals may be provided between the first and second members, one on each side of the annular trough.

External circuits may be connected to the hollow pipe waveguide side branches of the hybrid ring by way of choke joints.

An aperture may be provided for connection of each side branch to the annular waveguide, which viewed in the direction from the side branch towards the annular waveguide, passes first into the first member alone and then into the first and second members.

Each side branch may be matched to the annular waveguide by a discontinuity or discontinuities of the wall of the annular cavity.

If desired three members only may be provided in a further embodiment, the annular cavity being defined by either of the first and second members and by the third member accommodated therebetween. The third or third and fourth member may be porous and hence may be cast, for example, of brass, copper or aluminium.

The term "half" is to be interpreted in its simplest sense, that is to mean a congruent half.

The invention will now be explained with reference to the accompanying diagrammatic drawings, given by way of example, showing one embodiment of a hybrid ring according to the invention and in which:

Figure 3 is a sectional view of part of the hybrid ring taken on the line III—III of Figure 1;

Figure 4 is a view of part of the hybrid ring taken on the line IV—IV of Figure 1; and Fig. 5 shows a modification of the structure shown in Fig. 2.

Figure 1:
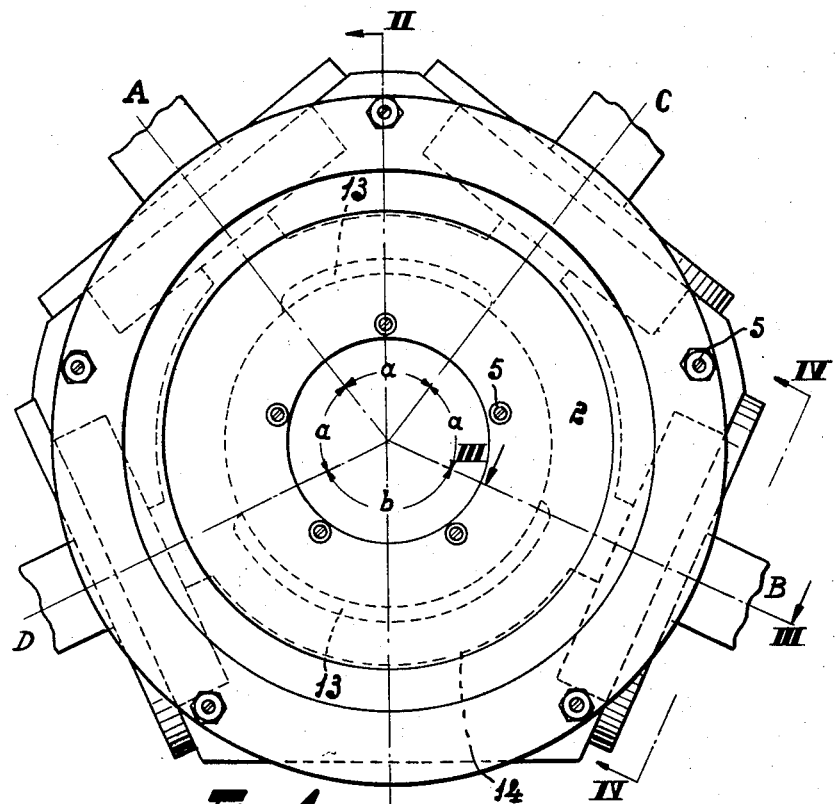
Figure 1 is a simplified plan view along the axis of the hollow pipe annular waveguide showing some concealed detail in broken lines.
Figure 2:
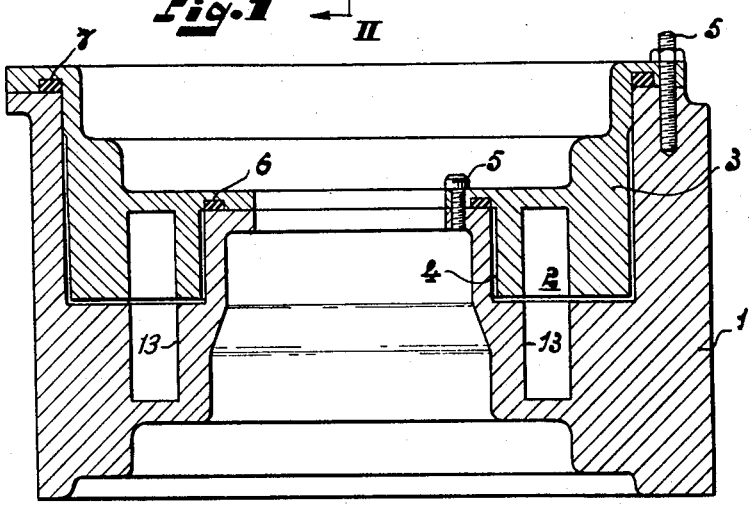
Figure 2 is a sectional view taken along the line II—II of Figure 1.

Referring now to the drawings, a hybrid ring comprises a first member 1 into which is machined half of an annular cavity of an annular hollow pipe waveguide 2 and a second member 3 in which is machined the other half of the annular cavity. The first member 1 comprises an annular trough 4 in which the second member 3 is accommodated.

The members 1 and 3 are required to be vacuum-tight and are machined from forgings of a material having good electrical conductivity.

The members 1 and 3 are secured together by bolts 5. An annular vacuum seal 6, for example, a rubber ring deformed to provide a seal when the members 1 and 3 are bolted together, is provided on the inner side of the trough 4 and an annular vacuum seal 7 is provided on the outer side of the trough 4.

At selected points around the periphery of the hybrid ring, the outer surface is plane and an aperture for each side branch is provided by boring a hole of circular cross-section first into the member 1 and then into the members 1 and 3. The hole of circular cross-section is coupled with the annular cavity by a hole of rectangular cross-section. Hollow pipe waveguides for external circuits are secured respectively to plates 9 having an outer rim 10. The outer rim 10 of a plate 9 seats against the bottom of the associated bore and the side branch is held spaced apart from the waveguide 2. The plate 9 is so shaped that effectively each external circuit 8 is coupled to the waveguide 2 by way of a quarter-wave choke and what is termed a choke joint is formed. Each plate 9 is sealed in a vacuum-tight manner to the associated flat surface provided on the member 1 by means of an annular vacuum seal 11 and the plate 9 is held in position by bolts 12.

The members 1 and 3 are of substantial thickness at the outer side (as viewed in Figure 1) to accommodate the flat surfaces to which the plates 9 are vacuum-joined. The other dimensions may be thinner, the minimum dimensions being dictated by requirements of rigidity during machining. With the angular spacing shown in Figure 1 between the centre lines of adjacent side branches, i. e. where $a : b :: 3 : 5$, and with a dummy load connected to the side branch A, if a high-frequency input of a wavelength determined by the dimensions of the hybrid ring is fed into the side branch B, the energy will be divided between the side branches C and D. The design and dimensioning of hybrid rings is well known and is described, for example, on pages 352 to 354 of Microwave Theory and Techniques, by Herbert J. Reich et al. (D. Van Nostrand Co., New York, 1953).

Each external circuit 8 is matched to the annular waveguide 2 by discontinuities of or in the annular cavity of the waveguide 2. The discontinuities are, in this case, provided by plates 13 soldered to the wall of the annular cavity and by projecting parts 14 integral therewith.

The vacuum seals are separate from the electrical junctions and with the embodiment shown, electrical junction between the members 1 and 3 at the annular cavity of the waveguide 2 is along a line across which there is zero current flow and in addition contact between the rims 10 and the members 1 and 3 are along lines across which there is zero current flow. The vacuum seals are all between pairs of flat uninterrupted surfaces. The junction between the members 1 and 3 adjacent the wave-guide 2 is non-critical and a small gap, for example, of 1/32 inch may be left here between the parts 1 and 3.

The hybrid ring described above with reference to the figures is readily demountable and adjustments may readily be made to the hybrid ring. The effect of the adjustments may readily be determined at high powers since the hybrid ring may be readily and effectively re-sealed.

In the modification of the construction illustrated in Fig. 5, the annular cavity of the annular waveguide 2 is constituted partly by a third member 3A and partly by a fourth member 1A. The third and fourth members 3A and 1A may be made from a material having a good electrical conductivity, for example, copper, or as an alternative the surfaces of the third and fourth members defining the annular cavity may be coated with a material having good electrical conductivity, for example, silver. The members 3A and 1A are shaped suitably to accommodate the ends of external circuits 8.

What is claimed is:

1. A gas-tight hybrid ring comprising a first member having an annular groove extending inwardly from a surface area thereof, a second member having an annular groove extending inwardly from a surface area thereof, said members being positioned so that said surface areas are in closely spaced mating relationship whereby said annular grooves cooperate to form an annular hollow waveguide having an electrical junction at said mating surface areas, the relative depths of said grooves being chosen so that said mating surface areas are at a region of substantially zero current flow in the operation of said waveguide, each of said members being provided with additional surface areas which mutually face one another, and gas-tight sealing means positioned between and in engagement with said mutually facing additional surface areas, thereby to provide a gas-tight seal which is separated from said electrical junction.

2. A hybrid ring as claimed in claim 1 in which said first member is provided with an annular trough defined by annular walls, the first-named surface area comprising the bottom of said trough, said second member being annularly shaped whereby said second member is substantially contained within said trough.

3. A hybrid ring as claimed in claim 2, in which said additional surface area of the first member comprises the upper annular surfaces of said annular walls, and in which said additional area of the second member comprises the lower surfaces of a pair of flanges extending inwardly and outwardly, respectively, from said annularly shaped second member.

4. A hybrid ring as claimed in claim 2, in which said annular grooves have substantially equal depths.

5. A hybrid ring as claimed in claim 4, in which the outer annular wall of said first member is provided with a plurality of openings arranged on the circumference thereof, and including a plurality of external waveguide side branches respectively connected to said openings in a gas-tight manner, said second member having portions thereof removed in the regions between the annular groove therein and said openings.

6. A hybrid ring as claimed in claim 2, in which each of said first and second members is made from a material having good electrical conductivity.

7. A hybrid ring as claimed in claim 2, in which each of said first and second members is provided with an insert member in the vicinity of said annular groove thereof, whereby each of said annular grooves is respectively located in said insert members.

8. A hybrid ring as claimed in claim 7, in which each of said insert members is made from a material having good electrical conductivity.

9. A hybrid ring as claimed in claim 7, in which each of said insert members comprises a surface coating of material having good electrical conductivity.

References Cited in the file of this patent

UNITED STATES PATENTS

| | | |
|---|---|---|
| 2,430,445 | Aamodt | Nov. 11, 1947 |
| 2,514,976 | Stivin | July 11, 1950 |
| 2,527,908 | Blitz | Oct. 31, 1950 |
| 2,574,790 | King | Nov. 13, 1951 |
| 2,595,186 | Breetz | Apr. 29, 1952 |
| 2,639,325 | Lewis | May 19, 1953 |
| 2,685,071 | McCreary | July 27, 1954 |